US008840125B2

(12) United States Patent
Huang

(10) Patent No.: US 8,840,125 B2
(45) Date of Patent: Sep. 23, 2014

(54) ROLLATOR WITH IMPROVED BRAKE DEVICE

(76) Inventor: Wendy Huang, New Taipei (TW)

( * ) Notice: Subject to any disclaimer, the term of this patent is extended or adjusted under 35 U.S.C. 154(b) by 82 days.

(21) Appl. No.: 13/606,738

(22) Filed: Sep. 7, 2012

(65) Prior Publication Data

US 2013/0062845 A1 Mar. 14, 2013

(30) Foreign Application Priority Data

Sep. 9, 2011 (TW) ............................. 100216979 U

(51) Int. Cl.

| | |
|---|---|
| ***B62M 1/00*** | (2010.01) |
| ***A61H 3/04*** | (2006.01) |
| *A61H 3/00* | (2006.01) |

(52) U.S. Cl.

CPC .......... *A61H 3/04* (2013.01); *A61H 2201/1676* (2013.01); *A61H 2003/003* (2013.01); *A61H 2201/0192* (2013.01); *A61H 2003/046* (2013.01); *A61H 2201/1633* (2013.01)

USPC .................................. 280/87.041; 280/47.34

(58) Field of Classification Search

USPC .............. 280/5.2, 5.26, 5.28, 5.32, 47.34, 37, 280/304.1, 33.992–33.997; 188/2 F, 2, 31, 188/19, 20, 25–26; 74/501.6

See application file for complete search history.

(56) References Cited

U.S. PATENT DOCUMENTS

| | | | | |
|---|---|---|---|---|
| 5,607,030 | A * | 3/1997 | Swift et al. | 188/1.12 |
| 6,126,176 | A * | 10/2000 | Eguchi et al. | 280/5.2 |
| 6,378,663 | B1 * | 4/2002 | Lee | 188/2 F |
| 7,395,902 | B2 * | 7/2008 | D'Arca et al. | 188/19 |

* cited by examiner

*Primary Examiner* — John Walters
*Assistant Examiner* — James Triggs
(74) *Attorney, Agent, or Firm* — SmithAmundsen LLC; Dennis S. Schell; Kelly J. Smith

(57) ABSTRACT

A rollator includes a support frame assembly, a handgrip unit pivotable relative to the support frame assembly between depressed and non-depressed positions, at least three wheels mounted pivotally to a bottom portion of the support frame assembly, and at least one braking device including a brake wire unit connected to the handgrip unit, and a brake fixed to the support frame assembly at a location proximate to one of the wheels and connected to the brake wire unit. The brake includes a casing, a stop member, and a gear connected coaxially to one of the wheels. The stop member is movable between free and braking positions where the stop member is spaced apart from and is engaged with the gear, respectively.

16 Claims, 16 Drawing Sheets

ROLLATOR WITH IMPROVED BRAKE DEVICE

CROSS REFERENCE TO RELATED APPLICATION

This application claims priority of Taiwanese Patent Application No. 100216979, filed on Sep. 9, 2011.

FIELD OF THE INVENTION

The invention relates to a rollator, more particularly to a rollator with an improved brake device.

DESCRIPTION OF THE RELATED ART

Existing brake devices of rollators are configured to brake the rollators either by pulling the brake handgrips or by stepping on the brake pedals.

For elderly people with poor memories, events of forgetting to pull the brake handgrips or stepping on the brake pedals take place from time to time which cause the rollators to roll down a slope.

In U.S. Pat. No. 6,338,355B1, there is disclosed a rollator with a safety brake type device. The rollator is designed such that when both hands of the user grip the releasing grips installed on both handgrip bars, the rollator will start to advance; and, when gripping of the releasing grips are released, the rollator is disposed in a braked or detained state. Through this configuration, problems related to the elderly people forgetting to brake may be resolved.

However, it is not easy for elderly people or those with mobility problems to grip the releasing grip for a long time to permit advancement of the rollator.

SUMMARY OF THE INVENTION

Therefore, an object of the present invention is to provide a rollator with an improved brake device that is simple, easy and effortless to operate and that is suitable for use by elderly or mobility impaired people.

According to this invention, a rollator with an improved braking device comprises a main frame body and at least one braking device. The main frame body includes a support frame assembly, a handgrip unit pivoted to a rear top side of the support frame assembly, and at least three wheels mounted pivotally to a bottom portion of the support frame assembly. The handgrip unit is pivotable relative to the support frame assembly between a depressed position and a non-depressed position. The braking device includes a brake wire unit connected to the handgrip unit and fixed to the support frame assembly, and a brake fixed to the support frame assembly at a location proximate to one of the wheels and connected to the brake wire unit. The brake includes a casing connected fixedly to the support frame assembly, a sliding member connected to the brake wire unit and slidable relative to the casing, a stop member connected to one end of the sliding member that is proximate to the one of the wheels, and a gear connected coaxially to the one of the wheels. The stop member is movable between a free position, where the stop member is spaced apart from the gear, and a braking position, where the stop member is engaged with the gear. When the handgrip unit is pivoted from the non-depressed position to the depressed position, the brake wire unit is displaced to move the brake, so that the stop member is moved from the braking position to the free position, and the wheels are free to rotate. When the handgrip unit is restored from the depressed position to the non-depressed position, the brake wire unit is displaced to move the brake, so that the stop member is moved from the free position to the braking position, and the wheels are prevented from rotation.

The effect of this invention resides in that because each handgrip can be operated between the depressed and non-depressed positions so as to switch the stop member between the free and braking positions, operation of the rollator of this invention is convenient and effortless and is suitable for use by elderly people.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The above-mentioned and other technical contents, features, and effects of this disclosure will be clearly presented from the following detailed description of one embodiment in coordination with the reference drawings.

Figure 1:
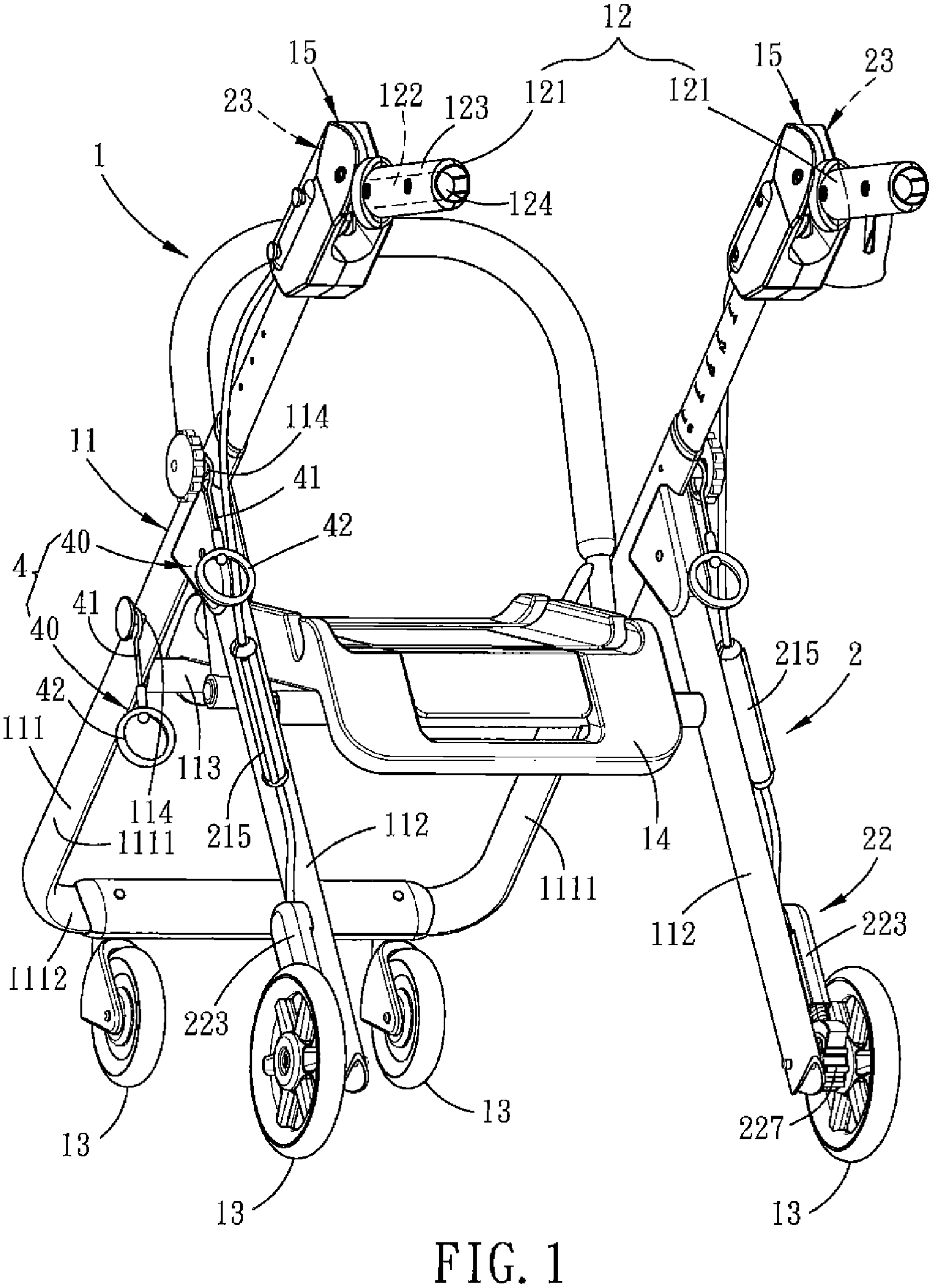
FIG. 1 is a perspective view of a collator with an improved braking device according to the preferred embodiment of this invention.

Referring to FIG. 1, a rollator with an improved braking device according to the preferred embodiment of the present invention is suitable for use by elderly or mobility-impaired people. The rollator of this invention has a mechanism that brakes when the user lets go of the handgrips, so that when the elderly or the mobility-impaired person forgets to apply a brake, the rollator will not roll away. The rollator of this invention comprises a main frame body 1 and at least one braking device 2. In this embodiment, two braking devices 2 will be exemplified.

The main frame body 1 includes a support frame assembly 11, a handgrip unit 12 pivoted to a rear top side of the support frame assembly 11, a seat cushion 14, and four wheels 13.

The support frame assembly 11 includes a U-shaped main support frame 111, two rear support rods 112, and an intermediate support frame 113. The U-shaped main support frame 111 extends obliquely rearward relative to a horizontal support surface, such as a ground, and includes two main support rods 1111 and a central bight portion 1112 connected between bottom ends of the main support rods 1111. Each of the rear support rods 112 extends obliquely forward relative to the horizontal support surface, and has a top end pivoted to a respective one of the main support rods 1111 between top and bottom ends thereof. The intermediate support frame 113 is connected to the front and rear support rods 1111, 112 below pivot junctions thereof. In this embodiment, two of the wheels 13 are pivotally mounted to the central bight portion 1112 of the main support frame 111, while the other two of the wheels 13 are mounted pivotally and respectively to bottom ends of the rear support rods 112. The seat cushion 14 is mounted on the intermediate support frame 113.

Figure 7:
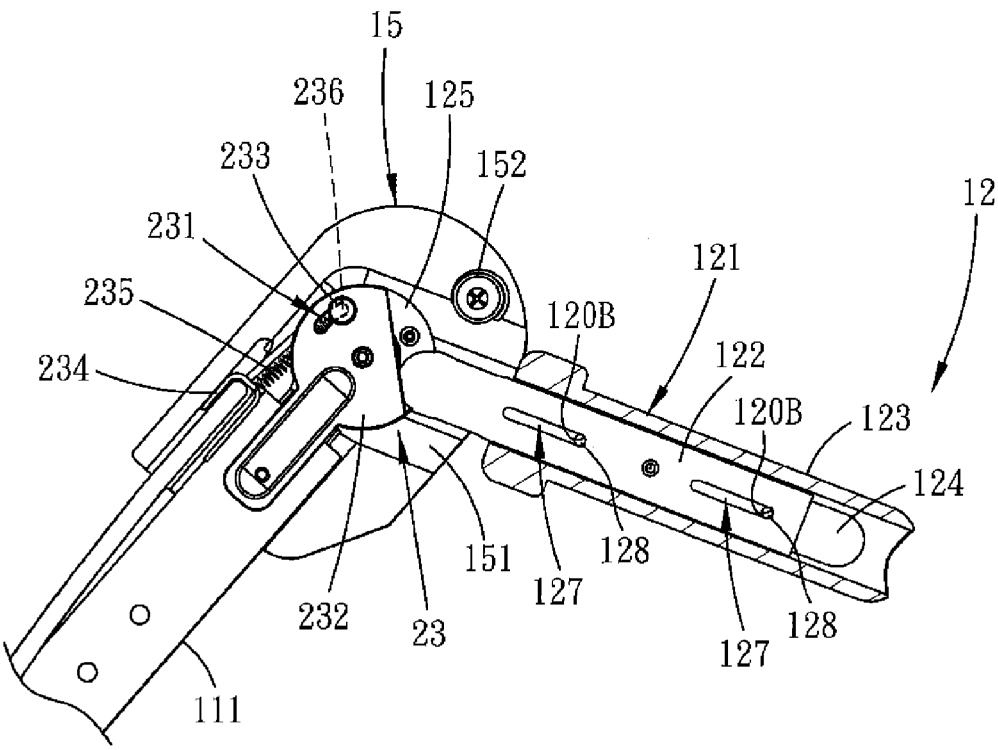
FIG. 7 is a view similar to FIG. 6, but illustrating the handgrip at the depressed position.
Figure 11:
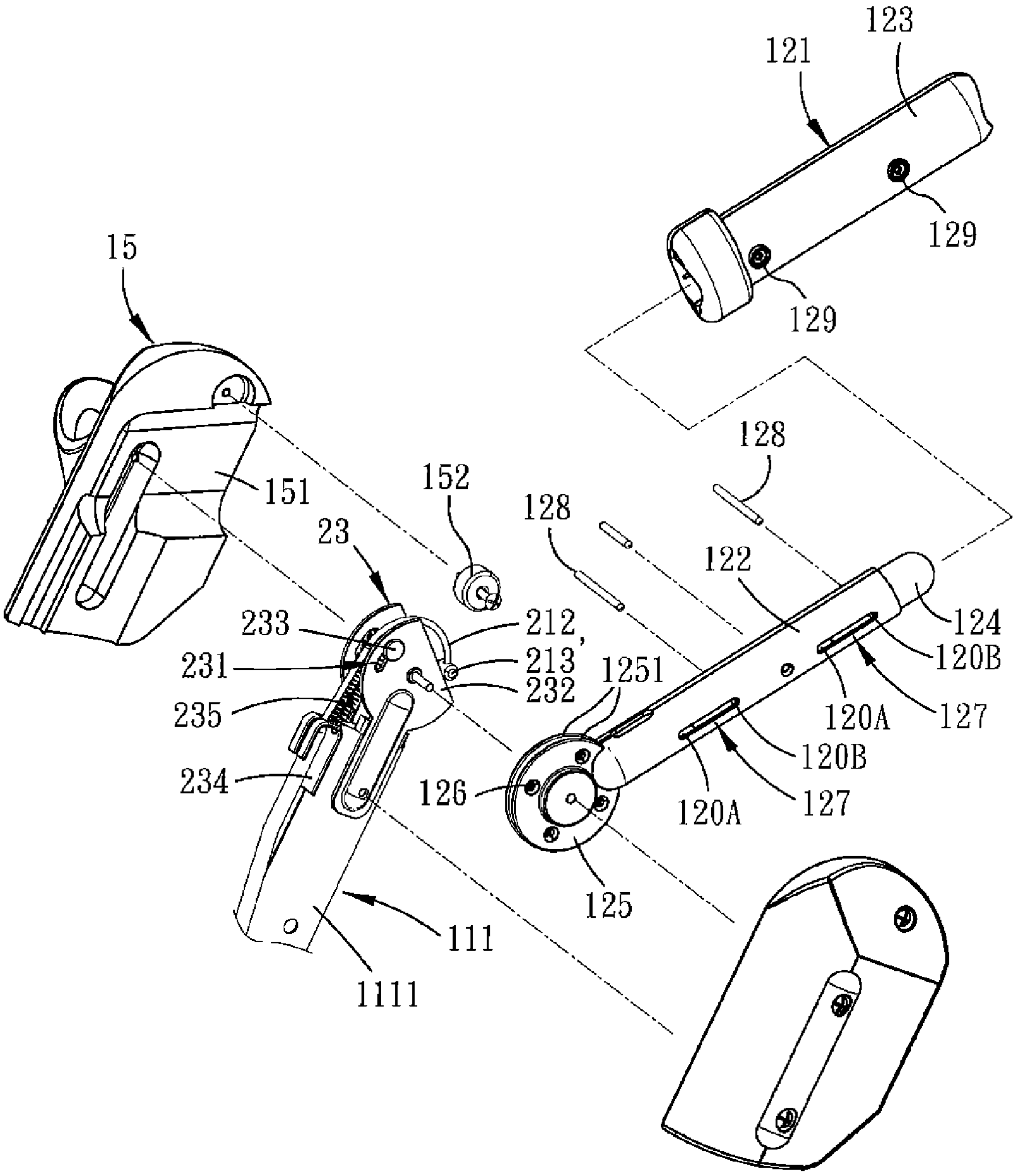
FIG. 11 is an enlarged exploded perspective view of the handgrip and a linkage mechanism.

Referring to FIGS. 1, 7 and 11, the handgrip unit 12 includes two handgrips 121 connected pivotally and respectively to the top ends of the main support rods 1111. Each of the handgrips 121 includes a lever 122, a tubular sleeve 123 sleeved slidably on and covering the lever 122, and a connecting portion 125 and a warning portion 124 respectively disposed on two opposite ends of the lever 122. The lever 122 of each handgrip 121 is pivotably connected to the top end of a respective main support rod 1111 through the connecting portion 125.

In order to allow smooth sliding movement of the tubular sleeve 123 relative to the lever 122 within a predetermined distance, the lever 122 has at least one pair of linear first sliding grooves 127 on two opposite sides thereof, each handgrip 121 further includes a first sliding pin 128 extending slidably through the pair of first sliding grooves 127, and the tubular sleeve 123 has a pair of through holes 129 (see FIG. 11) on two opposite sides thereof for extension of the first sliding pin 128 therethrough. In this embodiment, the number of pair of first sliding grooves 127 is two, the number of the first sliding pin 128 is two, and the number of pair of through holes 129 is two. The two pairs of first sliding grooves 127 are spaced apart from each other in a front-rear direction. Each first sliding groove 127 has a first end (120A) proximate to the connecting portion 125, and an opposite second end (120B) proximate to the warning portion 124. The function of the sliding movement of the tubular sleeve 123 relative to the lever 122 will be described later.

As shown in FIGS. 1, 6, 7, 8 and 11, the main frame body 1 further includes a pair of cover bodies 15, each of which covers a pivot junction of one of the main support rods 1111 and the lever 122 of a respective handgrip 121. Each cover body 15 defines a limiting space 151 having a shape conforming with that of the tubular sleeve 123 so that the tubular sleeve 123 can extend slidably and engagingly therein, and has an elastic pressing member 152 disposed above the limiting space 151 and partially embedded in a respective cover body 15. The elastic pressing member 152 is configured as a roller that is made of a rubber material. The functions of the limiting space 151 and the elastic pressing member 152 will be described later.

Figure 2:
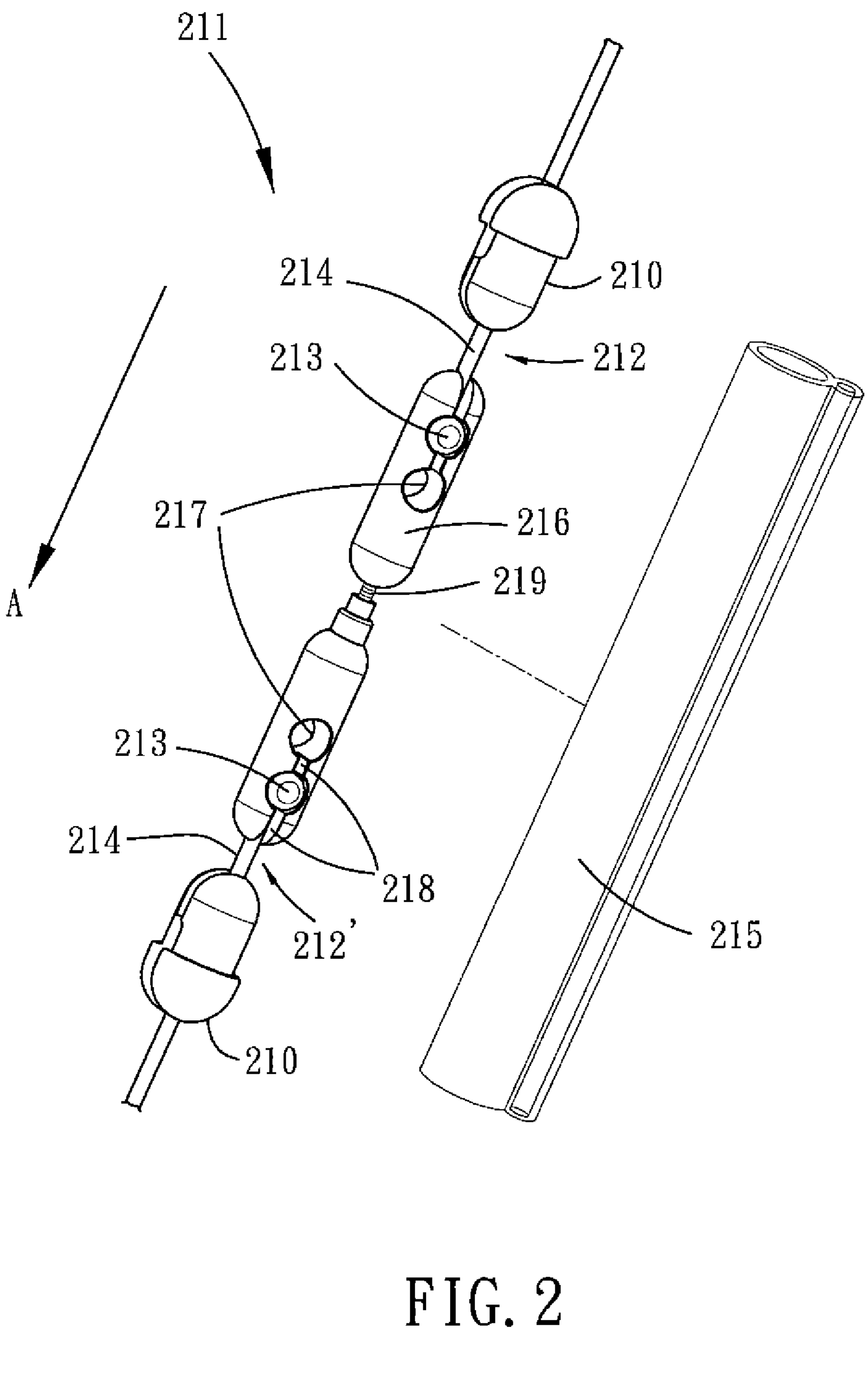
FIG. 2 is an enlarged exploded perspective view of a brake wire unit of the preferred embodiment.
Figure 3:
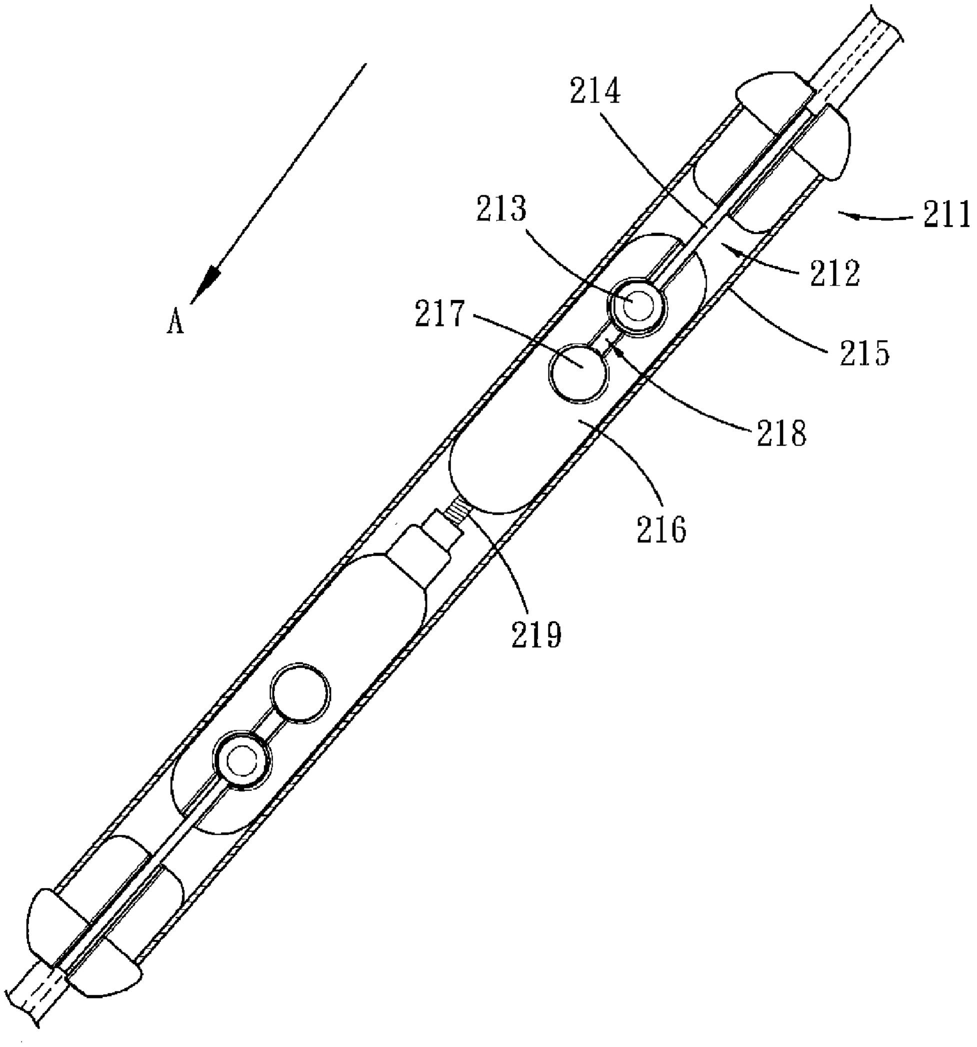
FIG. 3 is an enlarged partly sectional view of the brake wire unit of the preferred embodiment in an assembled state.

With reference to FIGS. 1 to 3, each of the braking devices 2 includes a brake wire unit 21, a brake 22, and a linkage mechanism 23.

The brake wire unit 21 of each braking device 2 includes an adjustment member 211 mounted to a respective one of the rear support rods 112, and two brake wires 212, 212' connected to the adjustment member 211.

The adjustment member 211 includes an elongated hollow housing 215, a plurality of adjusting blocks 216 received in the hollow housing 215 and arranged spaced apart from each other along a first direction (A) which corresponds to a length direction of the hollow housing 215, and at least one fine-tuning portion 219 disposed between two adjacent ones of the adjusting blocks 216. Each of the adjusting blocks 216 includes a plurality of pairs of positioning holes 217 formed in two opposite surfaces thereof and arranged spaced apart from each other along the first direction (A), and a plurality of pairs of longitudinal slots 218 that extend along the first direction (A) and that communicate with the positioning holes 217. Each pair of longitudinal slots 218 is disposed between each two adjacent pairs of positioning holes 217.

In this embodiment, the number of the adjusting blocks 216 is two, and the number of the fine-tuning portion 219 is one. Further, the fine-tuning portion 219 includes a screw rod projecting from an end of one of the adjusting blocks 216, and a screw hole formed in an end of the other adjusting block 216 and connected to the screw rod. Each positioning hole 217 has a hole diameter matching a diameter of the first insert end 213 of a corresponding brake wire 212, 212', and each longitudinal slot 218 has a width matching that of the wire body 214 of the corresponding brake wire 212, 212'.

Each of the brake wires 212, 212' includes a first insert end 213, a second insert end 213' opposite to the first insert end 213, and a wire body 214 that is connected between the first and second insert ends 213, 213' and that has a size smaller than that of the first and second insert ends 213, 213'. The first insert end 213 of the brake wire 212 is connected to one of the pairs of positioning holes 217 in one of the adjusting blocks 216, and the second insert end 213' thereof is connected to the connecting portion 125 of the corresponding handgrip 121. The first insert end 213 of the brake wire 212' is connected to one of the pairs of positioning holes 217 in the other one of the adjusting blocks 216, and the second inset end 213' thereof is connected to the brake 22 (see FIG. 4). It should be noted that each brake wire 212, 212' can extend through the longitudinal slot 218 through the wire body 214 thereof and position in one of the pairs of positioning holes 217 through the first insert end 213 thereof.

When the brake wires 212, 212' of each braking device 2 become loose or slack after a long period of use, a user can tighten the brake wires 212, 212' by himself/herself. With reference to FIG. 2, the user can first remove two plugs 210 from two opposite ends of the hollow housing 215, and then move the first insert ends 213 of the two brake wires 212, 212' close to each other by positioning them in the positioning holes 217 of the adjusting blocks 216 that are proximate to each other. If only a minute adjustment is necessary to move the two brake wires 212, 212' close to each other, the fine-tuning portion 219 is rotated to adjust the distance between the two adjusting blocks 216 to thereby adjust the distance between the two brake wires 212, 212'.

The disposition of the adjustment member 211 is not limited to the aforesaid disclosure. The adjustment member 211 may be connected inside the brake 22, or disposed in proximity to the handgrip 121, that is, where the second insert end 213' of the brake wire 212 is located. When the adjustment member 211 is disposed where the second insert end 213' of the brake wire 212 is located, the brake wire unit 21 only needs one brake wire.

Figure 4:
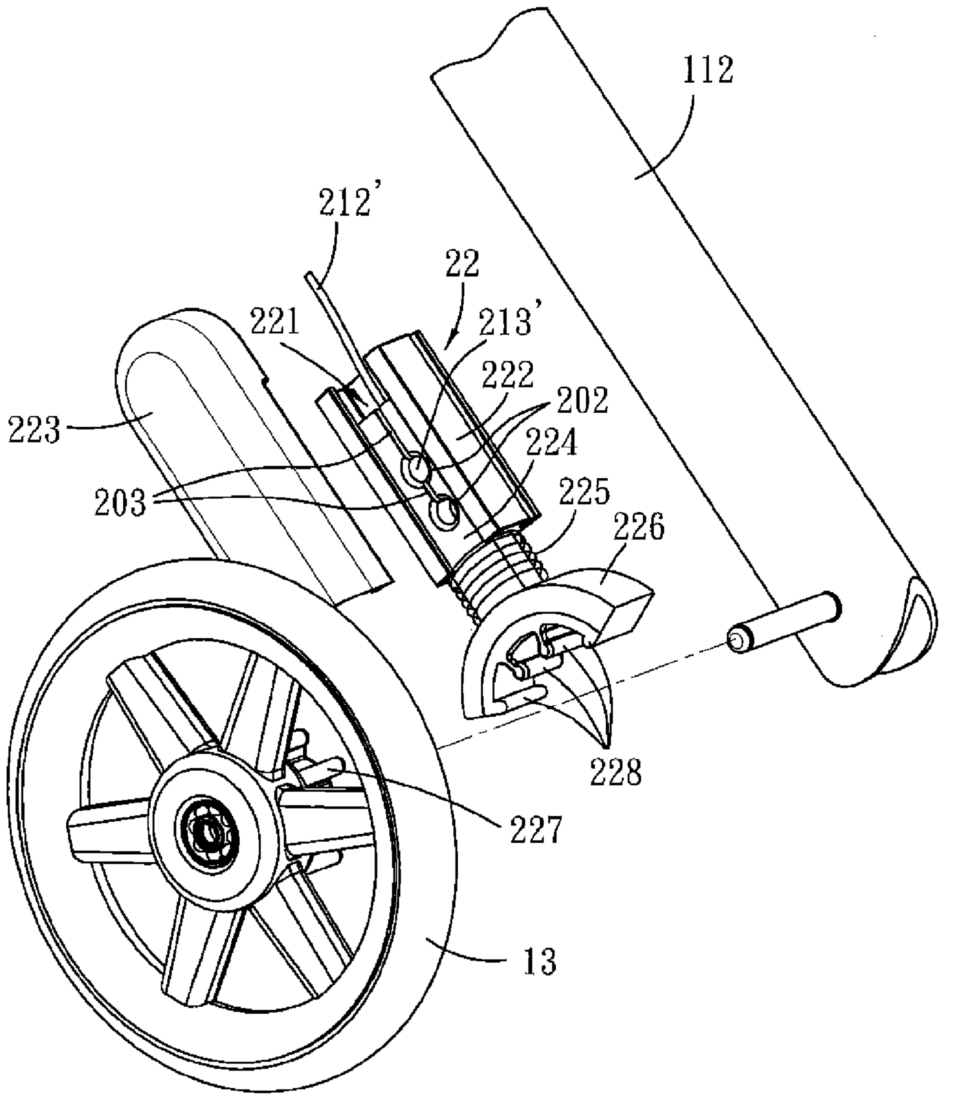
FIG. 4 is an enlarged exploded perspective view of a brake member of the preferred embodiment.

With reference to FIGS. 1 and 4, the brake 22 of each braking device 2 includes a casing 222 fixed to the bottom end of a respective rear support rod 112 and having an opening 221 proximate to the corresponding wheel 13, a cover 223 slidably connected to the casing 222 to close the opening 221, a sliding member 224 connected to the brake wire 212' and slidable relative to the casing 222, a first biasing member 225 sleeved on the sliding member 224, a stop member 226 connected to an end of the sliding member 224 that is proximate to the wheel 13, and a gear 227 connected coaxially to the wheel 13. The first biasing member 225 is a compression spring having one end abutting against the casing 222 and the other end abutting against the stop member 226 so as to bias the stop member 226 away from the casing 222. A bottom portion of the stop member 226 has a plurality of teeth 228 to matchingly engage with the gear 227. The sliding member 224 shown in FIG. 4 combines the design concept of the adjustment member 211 (see FIG. 3). That is, the sliding member 224 is formed with a plurality of pairs of positioning holes 202 and through slots 203 in opposite surfaces thereof. The second insert end 213' of the brake wire 212' is connected to one of the pairs of positioning holes 202. Through the configuration of the sliding member 224, the distance between the brake wires 212, 212' may also be adjusted at the brake 22.

Figure 15:
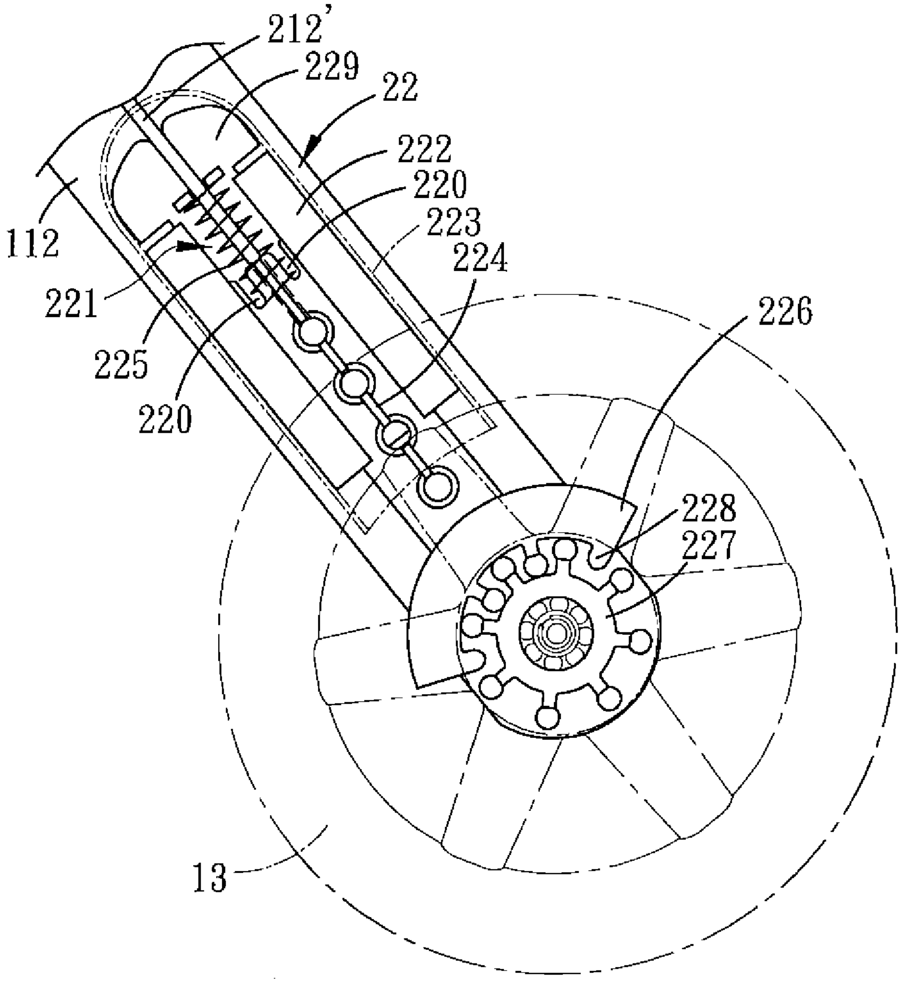
FIG. 15 is a view similar to FIG. 13, but illustrating an alternative disposition of a first biasing member.

Further, the disposition of the first biasing member 225 is not limited to the aforesaid disclosure. The first biasing member 225 may be disposed in other locations. For example, as shown in FIG. 15, the sliding member 224 is further formed with two positioning grooves 220 at two opposite inner surfaces thereof, and the brake 22 further includes a positioning member 229 fixed to the casing 222 and distal from the stop member 226. In this case, the first biasing member 225 is a compression spring having one end abutting against the positioning grooves 220 and the other end abutting against the positioning member 229 so as to bias the stop member 226 away from the casing 222.

Figure 12:
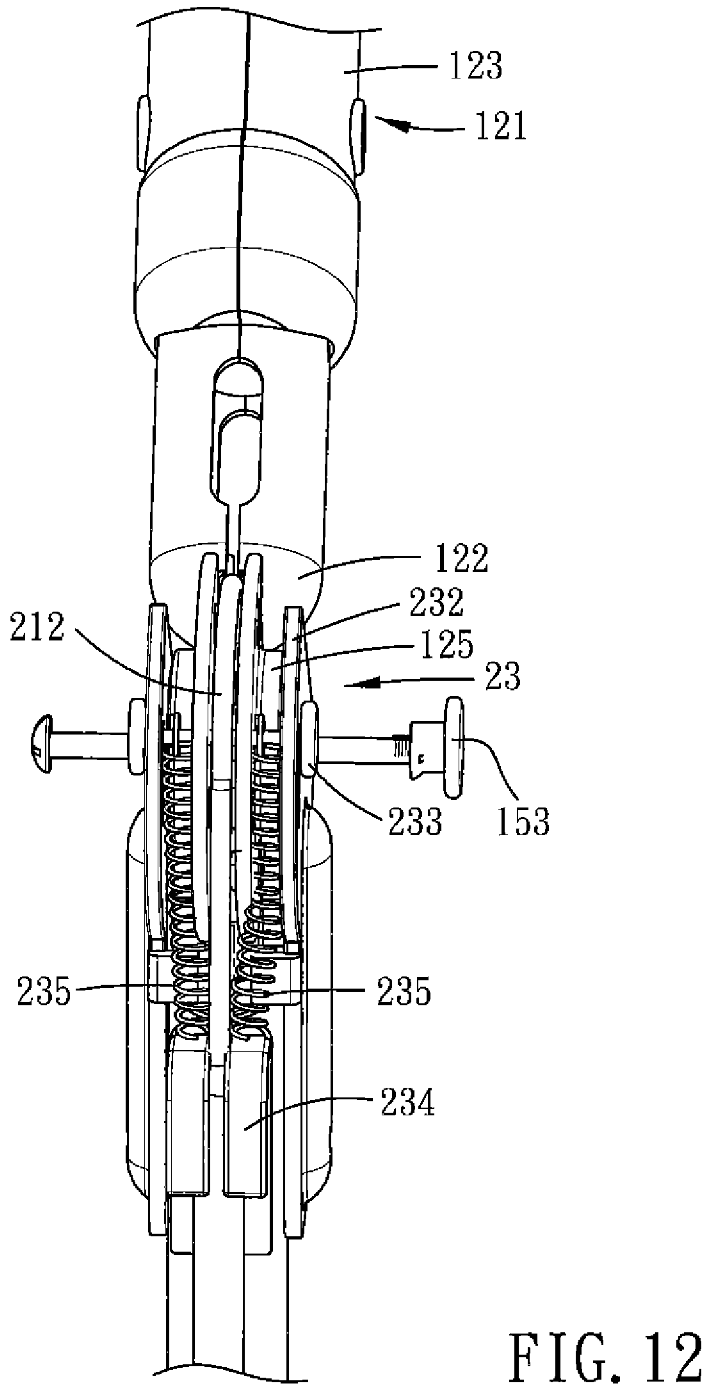
FIG. 12 is an assembled perspective view of the handgrip and the linkage mechanism.

Referring to FIGS. 11 and 12, the linkage mechanism 23 of each braking device 2 is connected to the respective handgrip 121, the brake wire 212, and the respective main support rod 1111. The linkage mechanism 23 includes two spaced-apart connection plates 232 fixed to the top end of the main support rod 1111 and each having a curved second sliding groove 231, a second sliding pin 233 extending slidably into the second sliding grooves 231 of the connection plates 232, a fixing member 234 fixed to the main support rod 1111 and sandwiching the brake wire 212 therebetween, and two second biasing members 235 disposed on two opposite sides of the brake wire 212 between the connection plates 232. The second sliding groove 231 of each connection plate 232 has a pressed end 236 (see FIG. 7) that is proximate to the lever 122 of the handgrip 121, and an opposite non-pressed end 237 (see FIG. 6) that is proximate to the main support rod 1111. In this embodiment, each of the second biasing members 235 is a tension spring having one end connected to the second sliding pin 233 and the other end connected to the fixing member 234.

Further, the connecting portion 125 of each handgrip 121 includes two spaced-apart plates 1251 (see FIG. 11) fixed to one end of the lever 122. Each of the plates 1251 has a plurality of angularly spaced-apart through orifices 126. The second insert end 213' of the brake wire 212 extends between the plates 1251 and is inserted into one of the aligned through orifices 126 of the plates 1251. The plates 1251 of the connecting portion 125 are pivotably clamped between the connection plates 232. The second sliding pin 233 extends through another one of the aligned through orifices 126 of the plates 1251.

Figure 5:
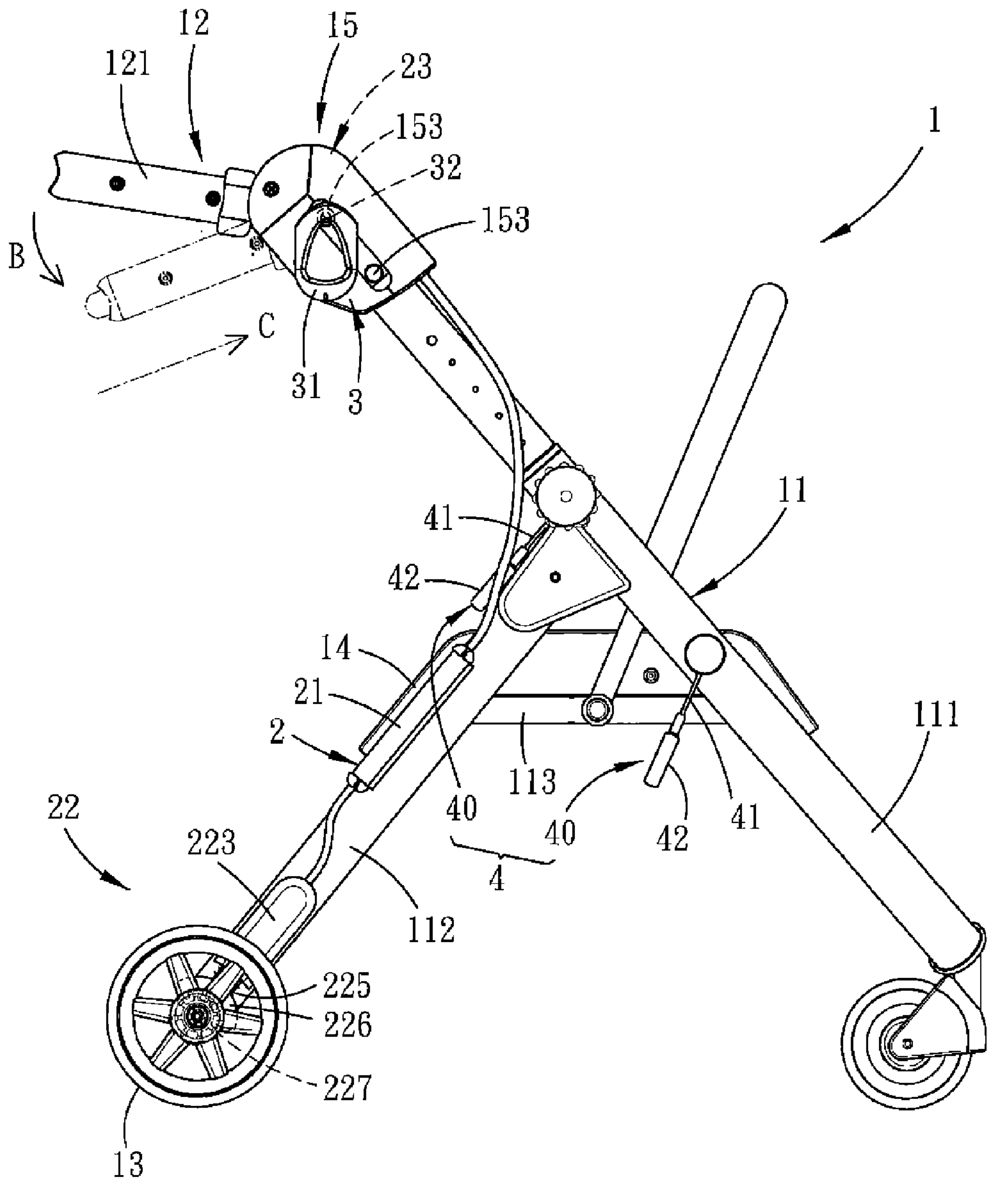
FIG. 5 is a schematic side view of the preferred embodiment, illustrating how a handgrip is pivotable relative to a support frame assembly between a depressed position and a non-depressed position.
Figure 6:
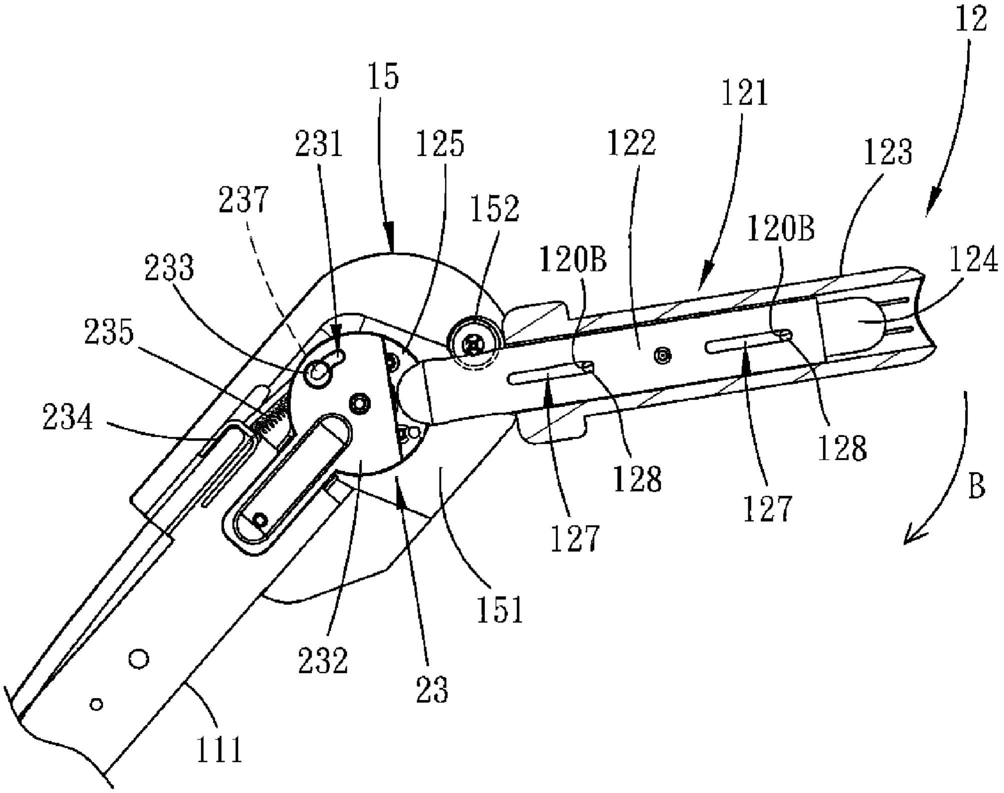
FIG. 6 is an enlarged partly sectional view of the preferred embodiment, illustrating the handgrip at the non-depressed position.

With reference to FIGS. 5 to 10, 13 and 14, each handgrip 121 of the handgrip unit 12 is pivotable relative to the support frame assembly 11 between a depressed position, as shown in FIG. 7, and a non-depressed position, as shown in FIG. 6. When the handgrip 121 is pivoted from the non-depressed position to the depressed position along a direction indicated by an arrow (B) (see FIG. 6), the brake wire unit 21 is displaced and moves the brake 22 and the linkage mechanism 23, so that the second sliding pin 233 of the linkage mechanism 23 slides to the pressed ends 236 of the second sliding grooves 231 of the connection plates 232. At this time, the second biasing members 235 are pulled to store restoring forces, and the stop member 226 of the brake 22 is moved relative to the gear 227 from a braking position shown in FIGS. 10 and 14 to a free position shown in FIGS. 9 and 13. In the free position, the stop member 226 is spaced apart from the gear 228, the first biasing member 225 is compressed at this time, and the wheels 13 can rotate freely.

Figure 10:
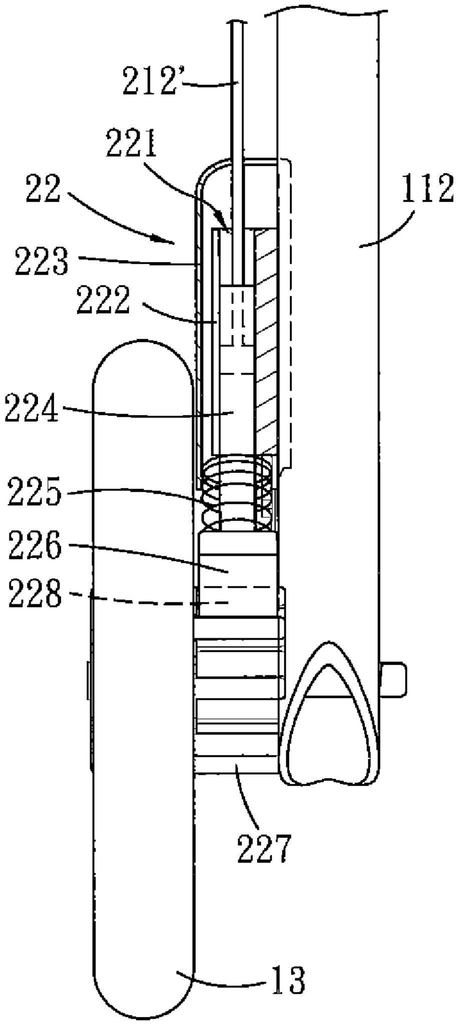
FIG. 10 is a view similar to FIG. 9, but illustrating the stop member and the gear in a braking position where they are engaged to each other.
Figure 14:
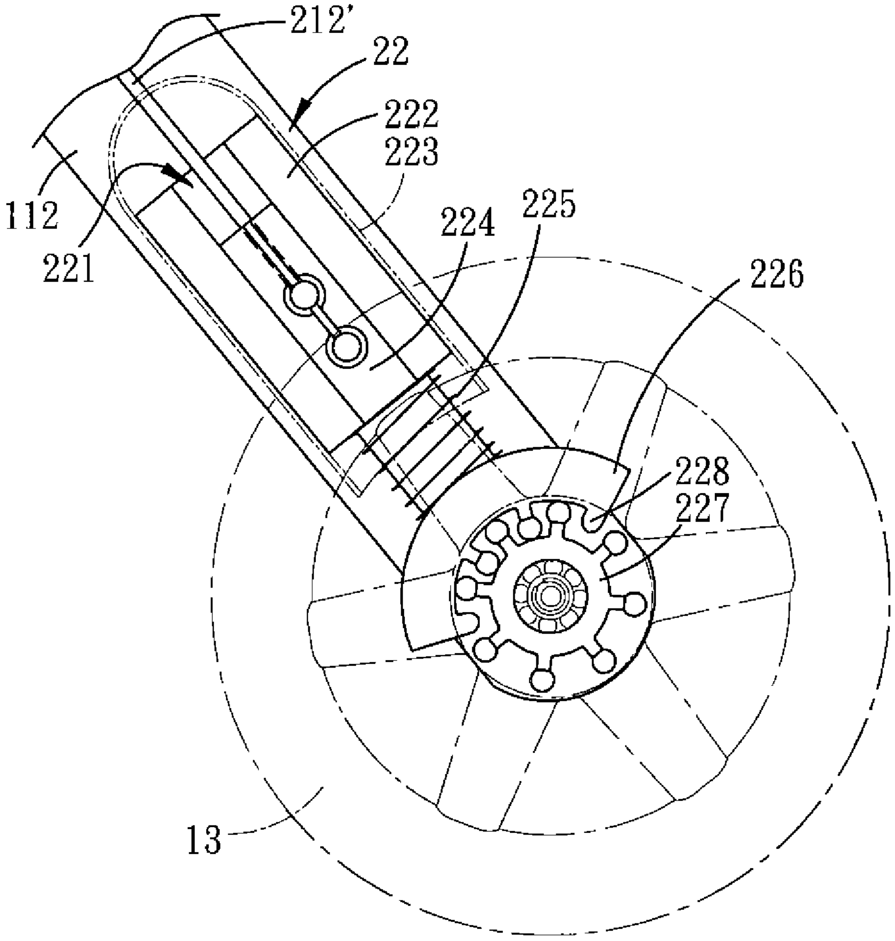
FIG. 14 is a view similar to FIG. 13, but illustrating the stop member and the gear in the braking position.

On the contrary, as shown in FIG. 6, when the handgrip 121 is restored from the depressed position to the non-depressed position, the second sliding pin 233 of the linkage mechanism 23 is slid to the non-pressed ends 237 of the second sliding grooves 231 of the connection plates 232, and the second biasing members 235 are released to generate restoring forces. At this time, the elastic pressing member 152 abuts against a top edge of the lever 122 and a front edge of the tubular sleeve 123 to moderately buffer the restoring forces of the second biasing members 235, thereby preventing friction among the lever 122, the tubular sleeve 123 and the cover body 15 that may result in damage of these components. As shown in FIGS. 10 and 14, the first biasing member 225 of the brake 22 is restored to its original position to bias the stop member 226 to move back to the braking position where the teeth 228 of the stop member 226 is engaged with the gear 227. Hence, the wheels 13 cannot rotate at this position.

Figure 8:
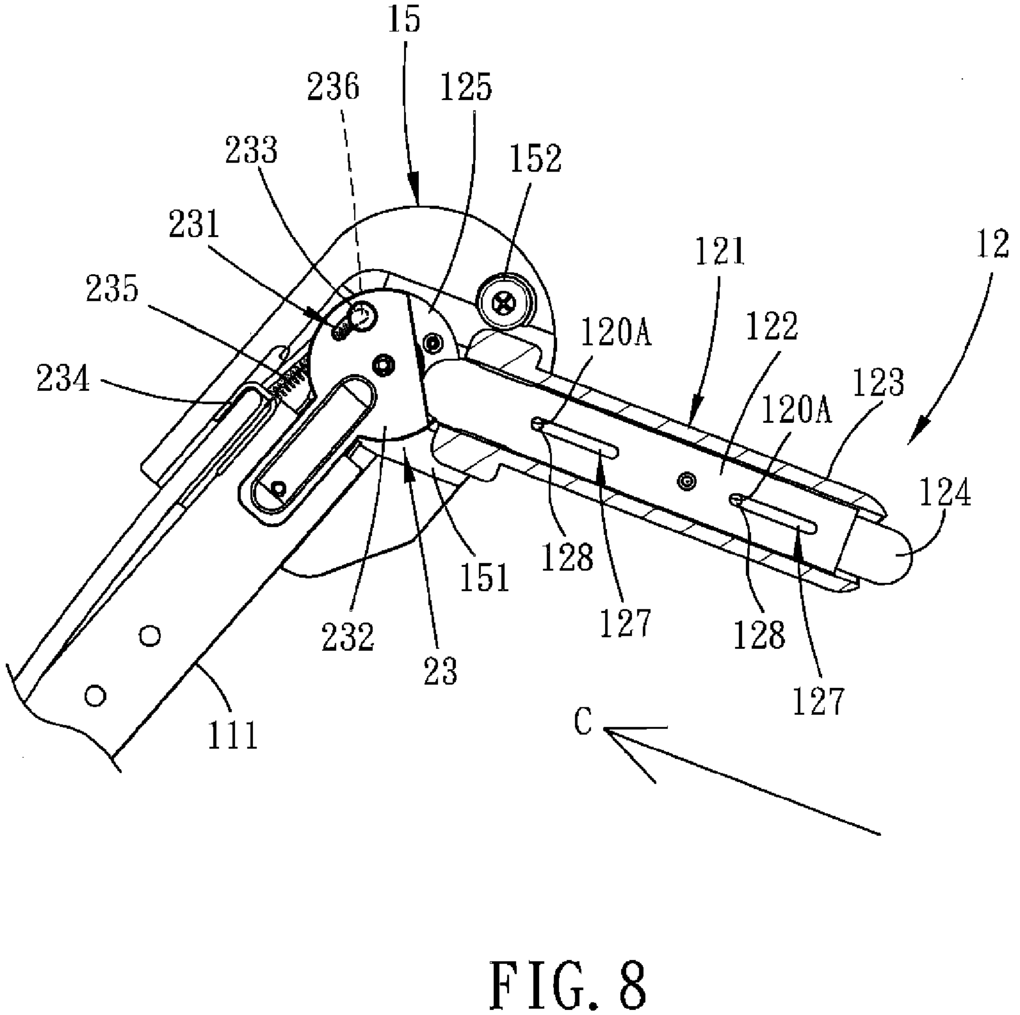
FIG. 8 is a view similar to FIG. 7, but illustrating how the handgrip can be positioned constantly at the depressed position.
Figure 9:
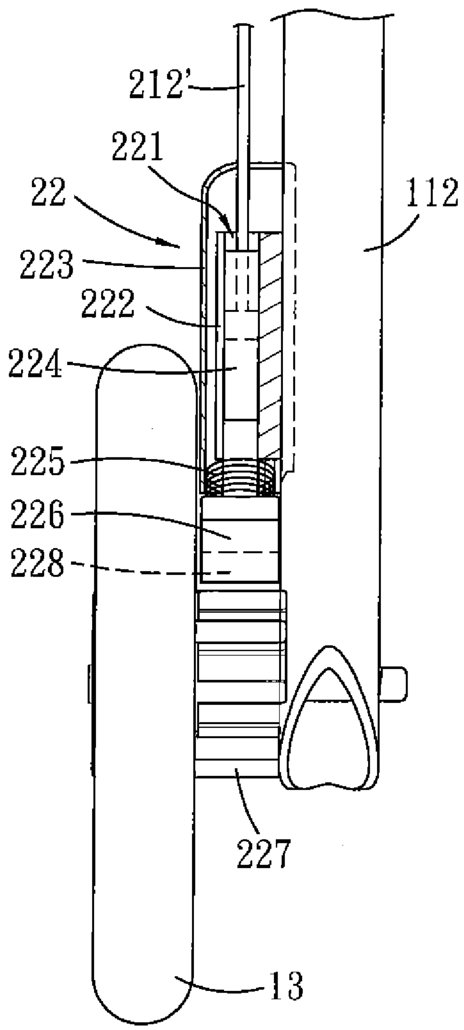
FIG. 9 is an enlarged partly sectional view of the preferred embodiment, illustrating a stop member and a gear in a free position where they are separated from each other.
Figure 13:
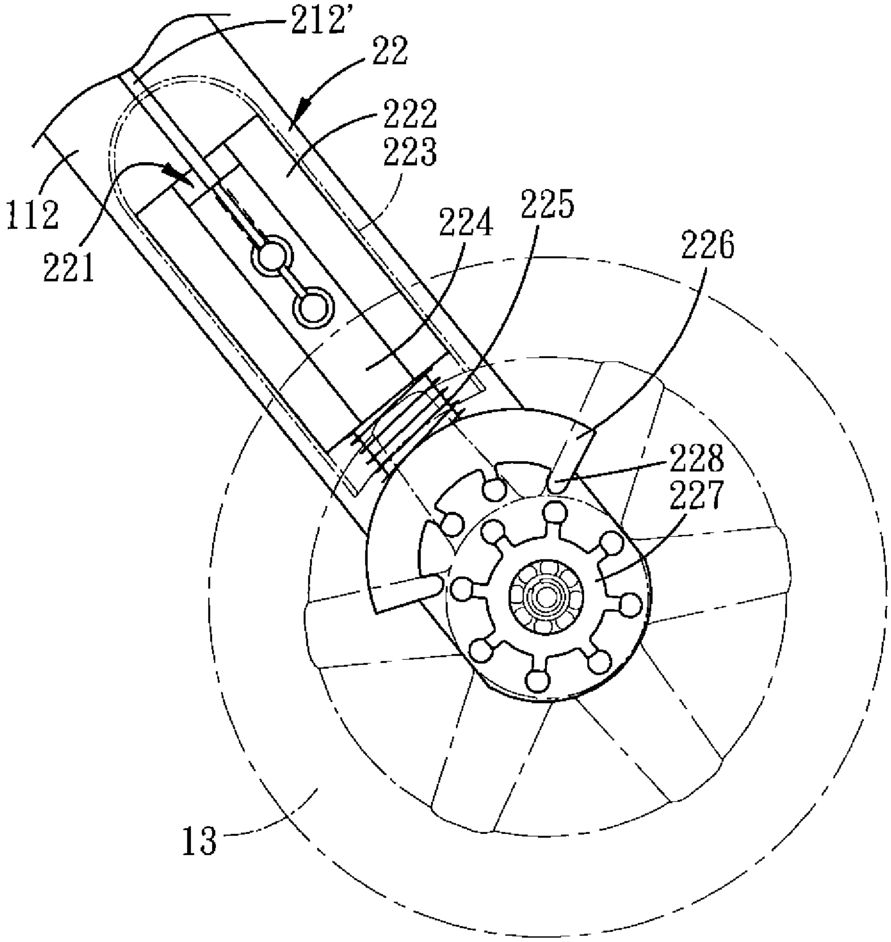
FIG. 13 is an enlarged fragmentary schematic view, illustrating the stop member and the gear in the free position.

Referring to FIGS. 8 and 13, when the handgrip 121 is in the depressed position, and the user desires to spare one hand to perform another task, for example, answer a call from a mobile phone, or drink water, etc., without making a brake, the other hand of the user can still grip the other handgrip 212 to continue pushing of the rollator. In this embodiment, a special design of the handgrip 121 is provided. That is, when the user pushes the tubular sleeve 123 of the handgrip 121 along a direction indicated by an arrow (C), the first sliding pins 128 of the handgrip 121 are slid to the first ends 120A of the respective first sliding grooves 127, and the tubular sleeve 123 is moved into the limiting space 151 and abuts against the elastic pressing member 152. A static friction between the tubular sleeve 123 and the elastic pressing member 152 places the tubular sleeve 123 in a state of static balance, and the handgrip 121 is positioned at the depressed position, thereby limiting the stop member 226 at the free position. At this time, the warning portion 124 is exposed from the tubular sleeve 123 to remind the user that, currently, the brake cannot function when the handgrip 121 is released. When the desired task is performed, the user can then pull the tubular sleeve 123 rearwardly. The elastic pressing member 152 provides a pushing force to slide the tubular sleeve 123 out of the limiting space 151, and the first sliding pins 128 of the handgrip 121 are slid to the second ends 120B of the respective first sliding grooves 127. The warning portion 124 is covered by the tubular sleeve 123 at this time, and the depressed position of the handgrip 121 is released.

Figure 16:
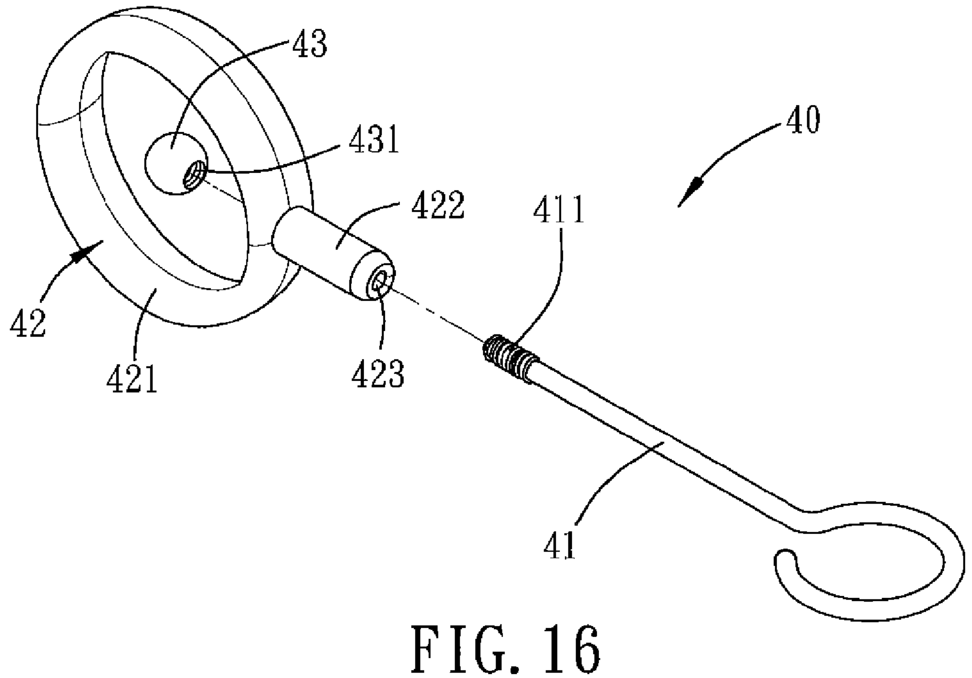
FIG. 16 is an enlarged exploded perspective view of a hanging ring unit.

Referring to FIGS. 1, 5 and 16, the rollator further comprises two umbrella support devices 4 respectively disposed at two opposite outer sides of the main support frame 111. Each umbrella support device 4 includes two hanging ring units 40 disposed spaced apart from each other on a corresponding one of the main support rods 1111.

Each main support rod 1111 of the main support frame 111 has two spaced-apart sleeve rods 114 projecting from an outer surface thereof. Each of the hanging ring units 4 has a connecting rod 41 connected to a respective sleeve rod 114, a hanging ring 42 rotatable 360 degrees relative to the connecting rod 41, and a limiting body 43. In this embodiment, the connecting rod 41 is a steel wire. The hanging ring 42 includes a ring body 421, a tubular body 422 extending radially from an outer surface of the ring body 421, and a passage hole 423 extending through the ring body 421 and the tubular body 422. The connecting rod 41 has one end configured as a hook to hang fixedly to the respective sleeve rod 114, and the other end extending through the passage hole 423 and formed with an external thread 411. The limiting body 43 in this embodiment is configured as a ball having an outer diameter larger than an inner diameter of the passage hole 423, and has an internal thread 431 engaged to the external thread 411 of the connecting rod 41 to prevent the connecting rod 91 from escaping from the hanging ring 42. In this embodiment, the ring body 421 and the tubular body 422 of the hanging ring 42 are slightly resilient, and the passage hole 423 has a hole diameter slightly smaller than an outer diameter of the connecting rod 41. As such, the connecting rod 41 extends through the passage hole 423 in a tight-fitting manner. Even though the hanging ring 42 can be rotated 360 degrees about the connecting rod 41, the connecting rod 41 cannot easily slide relative to the hanging ring 42.

To use the umbrella support device 4, the user may pivot the two connecting rods 41 such that the connecting rods 41 are substantially parallel and form an angle with the main support rod 1111, and then twist the hanging rings 42 such that the hanging rings 42 face the appropriate direction for placing an umbrella or cane through both hanging rings 42. In this embodiment, the ball-shaped limiting body 43 can prevent sharp portion of the connecting rods 41 from scratching the user's hand or the surface of the umbrella or the stick. When there is no need to place the umbrella or the cane on the rollator, the connecting rods 41 and the hanging rings 42 can be rotated such that the entire hanging ring unit 40 abuts against the main support frame 111.

If the umbrella, cane, or other similar object is smaller in diameter than the hanging ring 42, the user may also push the connecting rod 41 through the hanging ring 42 further, whereby causing the limiting body 43 to near the side of the hanging ring 42 opposite the tubular body 422. This divides the hanging ring 42 into two compartments so that slimmer umbrellas, canes, and other similar objects can use one of the compartments instead of the entire ring to better secure them in the umbrella support device 4.

Figure 17:
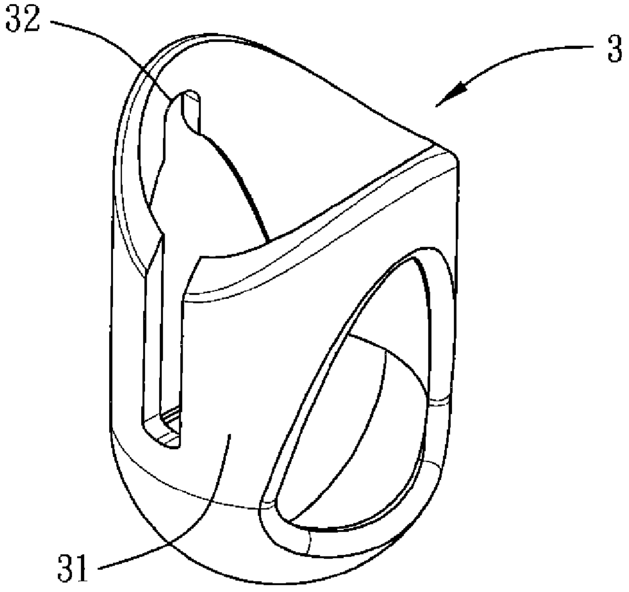
FIG. 17 is an enlarged perspective view of a cup holder.

Referring to FIGS. 5 and 17, the rollator of the present invention further includes a detachable cup holder 3 to facilitate the user to set down his/her beverage while using the rollator. Each cover body 15 includes at least one positioning stud 153 projecting from an outer surface thereof. The cup holder 3 is hung removably to the positioning stud 153, and includes a cup holder body 31 defining an accommodation space for receiving a beverage, and a hanging portion 32 formed on the cup holder body 31. In this embodiment, the hanging portion 32 is configured as a through hole that extends through one side of the cup holder body 31 and that has a size conforming with that of the positioning stud 153. As such, the cup holder 3 may be attached to either side of the rollator according to the user's requirement.

To sum up, because each handgrip 121 can be operated between the depressed and non-depressed positions so as to switch the stop member 226 between the free and braking positions, operation of the rollator of this invention is convenient and effortless and is suitable for use by elderly people. Hence, the object of this invention can be realized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A rollator with an improved braking device, comprising:

a main frame body including a support frame assembly, a handgrip unit pivoted to a rear top side of said support frame assembly, and at least three wheels mounted pivotally to a bottom portion of said support frame assembly, said handgrip unit being pivotable relative to said support frame assembly between a depressed position and a non-depressed position; and at least one braking device including a brake wire unit connected to said handgrip unit and fixed to said support frame assembly, and a brake fixed to said support frame assembly at a location proximate to one of said wheels and connected to said brake wire unit, said brake including a casing connected fixedly to said support frame assembly, a sliding member connected to said brake wire unit and slidable relative to said casing, a stop member connected to one end of said sliding member that is proximate to said one of said wheels, and a gear connected coaxially to said one of said wheels, said stop member being movable between a free position, where said stop member is spaced apart from said gear, and a braking position, where said stop member is engaged with said gear;

when said handgrip unit is pivoted from said non-depressed position to said depressed position, said brake wire unit is displaced to move said brake, so that said stop member is moved from said braking position to said free position, and said wheels are free to rotate; and when said handgrip unit is restored from said depressed position to said non-depressed position, said brake wire unit is displaced to move said brake, so that said stop member is moved from said free position to said braking position, and said wheels are prevented from rotation;

wherein said handgrip unit includes two handgrips, each of which is pivotable relative to said support frame assembly between said depressed position and said non-depressed position, each of said handgrips including a lever pivoted to said support frame assembly, a tubular sleeve sleeved slidably on and covering said lever, and a warning portion disposed on one end of said lever that is distal from said support frame assembly, when said tubular sleeve is pushed inwardly of said lever, said warning portion is exposed from said tubular sleeve and said handgrip is retained in said depressed position.

2. The rollator as claimed in claim 1, wherein each of said handgrips further includes a connecting portion disposed on another end said lever that is opposite to said warning portion and that is proximate to said support frame assembly, said lever having at least one first sliding groove, each of said handgrips further including a first sliding pin corresponding in number with said first sliding groove, said tubular sleeve having a through hole corresponding in number with said first sliding pin, said first sliding pin extending slidably through said first sliding groove and said through hole in said tubular sleeve, said first sliding groove having a first end proximate to said connecting portion, and a second end proximate to said warning portion.

3. The rollator as claimed in claim 1, wherein said brake wire unit includes an adjustment member, and at least one brake wire disposed in said adjustment member, said brake wire including a first insert end and a wire body connected to said first insert end and having a size smaller than that of said first insert end, said adjustment member having a plurality of adjusting blocks arranged spaced apart from each other in a first direction, at least one fine-tuning portion disposed between two adjacent ones of said adjusting blocks, a plurality of positioning holes formed in surfaces of said adjusting blocks and arranged spaced apart from each other in said first direction, and a plurality of longitudinal slots formed in said surfaces of said adjusting blocks and communicating with said positioning holes, each of said positioning holes having a hole diameter conforming with said first insert end, each of said longitudinal slots having a width conforming with that of said wire body, said brake wire being connected to one of said adjusting blocks by inserting said first insert end into one of said positioning holes.

4. The rollator as claimed in claim 3, wherein said adjustment member further has a hollow housing that accommodates said adjusting blocks.

5. A rollator with an improved braking device, comprising:

a main frame body including a support frame assembly, a handgrip unit pivoted to a rear top side of said support frame assembly, and at least three wheels mounted pivotally to a bottom portion of said support frame assembly, said handgrip unit being pivotable relative to said support frame assembly between a depressed position and a non-depressed position; and at least one braking device including a brake wire unit connected to said handgrip unit and fixed to said support frame assembly, and a brake fixed to said support frame assembly at a location proximate to one of said wheels and connected to said brake wire unit, said brake including a casing connected fixedly to said support frame assembly, a sliding member connected to said brake wire unit and slidable relative to said casing, a stop member connected to one end of said sliding member that is proximate to said one of said wheels, and a gear connected coaxially to said one of said wheels, said stop member being movable between a free position, where said stop member is spaced apart from said gear, and a braking position, where said stop member is engaged with said gear;

when said handgrip unit is pivoted from said non-depressed position to said depressed position, said brake wire unit is displaced to move said brake, so that said stop member is moved from said braking position to said free position, and said wheels are free to rotate; and when said handgrip unit is restored from said depressed position to said non-depressed position, said brake wire unit is displaced to move said brake, so that said stop member is moved from said free position to said braking position, and said wheels are prevented from rotation;

wherein said brake further includes a first biasing member sleeved on said sliding member, said first biasing member having one end abutting against said casing and the other end abutting against said stop member to bias said stop member away from said casing, said casing having an opening proximate to said one of said wheels.

6. The rollator as claimed in claim 3, wherein said sliding member includes two positioning grooves disposed on two opposite sides of said brake wire, said brake further including a first biasing member and a positioning member fixed to said casing and distal from said stop member, said first biasing member having one end abutting against said position grooves and the other end abutting against said positioning member to bias said stop member away from said casing.

7. The rollator as claimed in claim 5, wherein said brake further includes a cover connected slidably to said casing to close said opening.

8. The rollator as claimed in claim 3, wherein said support frame assembly includes a main support frame, said main frame body further including a pair of cover bodies each covering a pivot junction of said main support frame and a respective one of said handgrips, each of said cover bodies defining a limiting space having a shape conforming with that of said tubular sleeve to receive slidably said tubular sleeve, said main frame body further including an elastic pressing member disposed above said limiting space of each of said cover bodies and partially embedded in one of said cover bodies, when each of said handgrips is in said non-depressed position, said elastic pressing member abuts against a top edge of said lever and a front edge of said tubular sleeve, and when each of said handgrips is in said depressed position, said tubular sleeve is slid into said limiting space, and said elastic pressing member abuts against a top edge of said tubular sleeve to retain said handgrip in said depressed position.

9. The rollator as claimed in claim 8, wherein said braking device further includes a linkage mechanism connected to said handgrip unit, said brake wire unit and said main support frame, said linkage mechanism including two spaced-apart connection plates fixed to one end of said main support frame, each of said linkage mechanism having a curved second sliding groove, a second sliding pin extending slidably into said second sliding groove, a fixing member fixed to said main support frame spaced apart from said connection plates and sandwiching said brake wire, and two second biasing members disposed between said second sliding pin and said fixing member, said brake wire being disposed between said second biasing members, said second sliding groove having a pressed end and an opposite non-pressed end.

10. The rollator as claimed in claim 9, wherein each of said handgrips further includes a connecting portion fixed to one end of said lever opposite to said warning portion and proximate to said support frame assembly, said brake wire further including a second insert end opposite to said first insert end and fixed to said connecting portion, said connecting portion being pivotably clamped between said connection plates and having a through orifice for extension of said second sliding pin therethrough.

11. The rollator as claimed in claim 10, wherein each of said second biasing members has one end connected to said second sliding pin, and the other end connected to said fixing member to provide a restoring force to restore said handgrip to said non-depressed position, when said handgrip is in said depressed position, said second sliding pin is moved to said pressed end, and when said handgrip is in said non-depressed position, said second sliding pin is moved to said non-depressed end.

12. The rollator as claimed in claim 8, wherein each of said cover bodies has at least one positioning stud projecting from an outer surface thereof, said rollator further comprising a cup holder that is hung removably on said positioning stud, said cup holder including a cup holder body defining an accommodation space for accommodating a container, and a hanging portion formed on said cup holder body.

13. The rollator as claimed in claim 12, wherein said hanging portion is configured as a through hole extending through one side of said cup holder body and having a size conforming with that of said positioning stud.

14. The rollator as claimed in claim 8, further comprising at least one umbrella support device that is disposed on an outer side of said main support frame, said umbrella support device including two spaced-apart hanging ring units, each of said hanging ring units including a connecting rod fixed to said main support frame, and a hanging ring rotatable 360 degrees relative to said connecting rod.

15. The rollator as claimed in claim 14, wherein said hanging ring includes a ring body, a tubular body extending radially from an outer surface of said ring body, and a passage hole extending through said ring body and said tubular body, said connecting rod having one end configured as a hook that is hooked to said main support frame, and the other end extending through said passage hole and formed with an external thread, each of said hanging ring units further including a limiting body having an outer diameter larger than an inner diameter of said passage hole, said limiting body having an internal thread to engage with said external thread of said connecting rod, said limiting body being fastened to one end of said connecting rod to prevent said connecting rod from escaping from said hanging ring.

16. The rollator as claimed in claim 15, wherein said passage hole has a hole diameter slightly smaller than an outer diameter of said connecting rod.

* * * * *